United States Patent
Chen

(10) Patent No.: US 9,302,371 B2
(45) Date of Patent: Apr. 5, 2016

(54) LENGTH ADJUSTABLE WORK TABLE

(71) Applicant: Rexon Industrial Corp., Ltd., Taichung (TW)

(72) Inventor: Jung-Huo Chen, Taichung (TW)

(73) Assignee: REXON INDUSTRIAL CORP., LTD., Taichung (TW)

( * ) Notice: Subject to any disclaimer, the term of this patent is extended or adjusted under 35 U.S.C. 154(b) by 119 days.

(21) Appl. No.: 14/136,413

(22) Filed: Dec. 20, 2013

(65) Prior Publication Data

US 2014/0175725 A1    Jun. 26, 2014

(30) Foreign Application Priority Data

Dec. 25, 2012  (TW) .............................. 101149840 A

(51) Int. Cl.
  *B25B 11/00*  (2006.01)
  *B23Q 1/74*  (2006.01)

(52) U.S. Cl.
  CPC .. *B25B 11/00* (2013.01); *B23Q 1/74* (2013.01)

(58) Field of Classification Search
  CPC .................................. B25B 11/00; B23Q 1/74
  USPC ........... 269/55, 58, 59, 63, 67, 68, 70, 289 R; 144/287
  See application file for complete search history.

(56) References Cited

U.S. PATENT DOCUMENTS

| | | | | |
|---|---|---|---|---|
| 5,722,308 | A * | 3/1998 | Ceroll et al. | 83/438 |
| 5,931,209 | A * | 8/1999 | Chang | 144/287 |
| 5,954,106 | A * | 9/1999 | Huang | 144/286.5 |
| 6,112,785 | A * | 9/2000 | Yu | 144/287 |
| 6,189,429 | B1 * | 2/2001 | Liu | 83/477 |
| 6,293,176 | B1 * | 9/2001 | Talesky | 83/438 |
| 6,450,077 | B1 * | 9/2002 | Ceroll et al. | 83/468.7 |
| 6,986,370 | B1 * | 1/2006 | Schoene et al. | 144/287 |
| 7,441,487 | B2 * | 10/2008 | Liu et al. | 83/477.2 |
| 8,967,027 | B2 * | 3/2015 | Koegel | 83/435.27 |
| 2011/0297054 | A1 | 12/2011 | Chiu | |

* cited by examiner

*Primary Examiner* — Lee D Wilson
*Assistant Examiner* — Jamal Daniel
(74) *Attorney, Agent, or Firm* — Bacon & Thomas, PLLC

(57) ABSTRACT

A length adjustable worktable includes a main table, a side extension, a guide unit, and an actuating device. The guide unit is engaged with the side extension for guiding the side extension to slide toward or away from the main table. The actuating device includes an operating member, a driving unit, and a positioning member. By manipulating the operating member, the driving unit and the positioning member are driven, such that the side extension is able to slide toward or away from the main table along the guiding unit, thereby allowing the length of the worktable to be adjusted.

14 Claims, 11 Drawing Sheets

LENGTH ADJUSTABLE WORK TABLE

FIELD OF THE INVENTION

The present invention relates to machine tool technology, and more particularly to a length adjustable worktable for a machine tool.

BACKGROUND

Referring to FIGS. 1 and 2, an extendable worktable 1 for a machine tool is known for supporting a workpiece. The extendable worktable 1 comprises a main table 101, two side extensions 102 respectively mounted at two opposite sides of the main table 101 and movable relative to each other, two pairs of guide rods 103 respectively extended from the side extensions 102 and respectively slidably coupled to the bottom side of the main table 101, two pairs of clamping devices 104 mounted at the bottom side of the main table 101 and respectively attached to the guide rods 103, and two pairs of operating members 105 respectively eccentrically connected to the clamping devices 104 and operable to move the respective clamping devices 104 between a locking position to lock the respective guide rods 103 or an unlocking position to release the respective guide rods 103. When the clamping devices 104 are unlocked from the respective guide rods 103, the side extensions 102 are movable relative to the main table 101 to adjust the overall length of the extendable worktable 1 for holding different sizes of workpieces.

However, when wishing to move the side extensions 102 relative to the main table 101, the operator must operate the operating members 105 to unlock the respective clamping devices 104 from the respective guide rods 103. After adjustment of the position of each side extension 102, the operator must operate the operating members 105 to lock the respective clamping devices 104 to the respective guide rods 103 again. This operation procedure is complicated and inconvenient.

SUMMARY OF THE INVENTION

The present invention has been accomplished under the circumstances in view. It is therefore the main object of the present invention to provide a length adjustable worktable, which has the characteristics of simple structure and ease of operation.

To achieve this and other objects of the present invention, a length adjustable worktable comprises a main table, a side extension, a guide unit and an actuating device. The side extension is movable relative to the main table. The guide unit is connected to the side extension for enabling the side extension to slide relative to the main table. The actuating device comprises an operating member which is pivotally connected to the side extension, a driving unit which is mounted at the main table and is movable by the operating member, and a positioning member which is connected to the driving unit corresponding to the guide unit. Operating the operating member can drive the driving unit and the positioning member to lock the side extension to the main table or to unlock the side extension from the main table.

The main benefit of the present invention is that operating the operating member of the actuation device can drive the driving unit, causing the positioning member to be locked to, or released from, the guide unit, and thus adjustment of the length of the length adjustable worktable can easily be achieved. Further, the overall structure of the length adjustable worktable is simple and easy to operate.

BRIEF DESCRIPTION OF THE DRAWINGS

Other advantages and features of the present invention will be understood by reference to the following specification in conjunction with the accompanying drawings, in which like reference characters denote like elements of structure.

Figure 1:
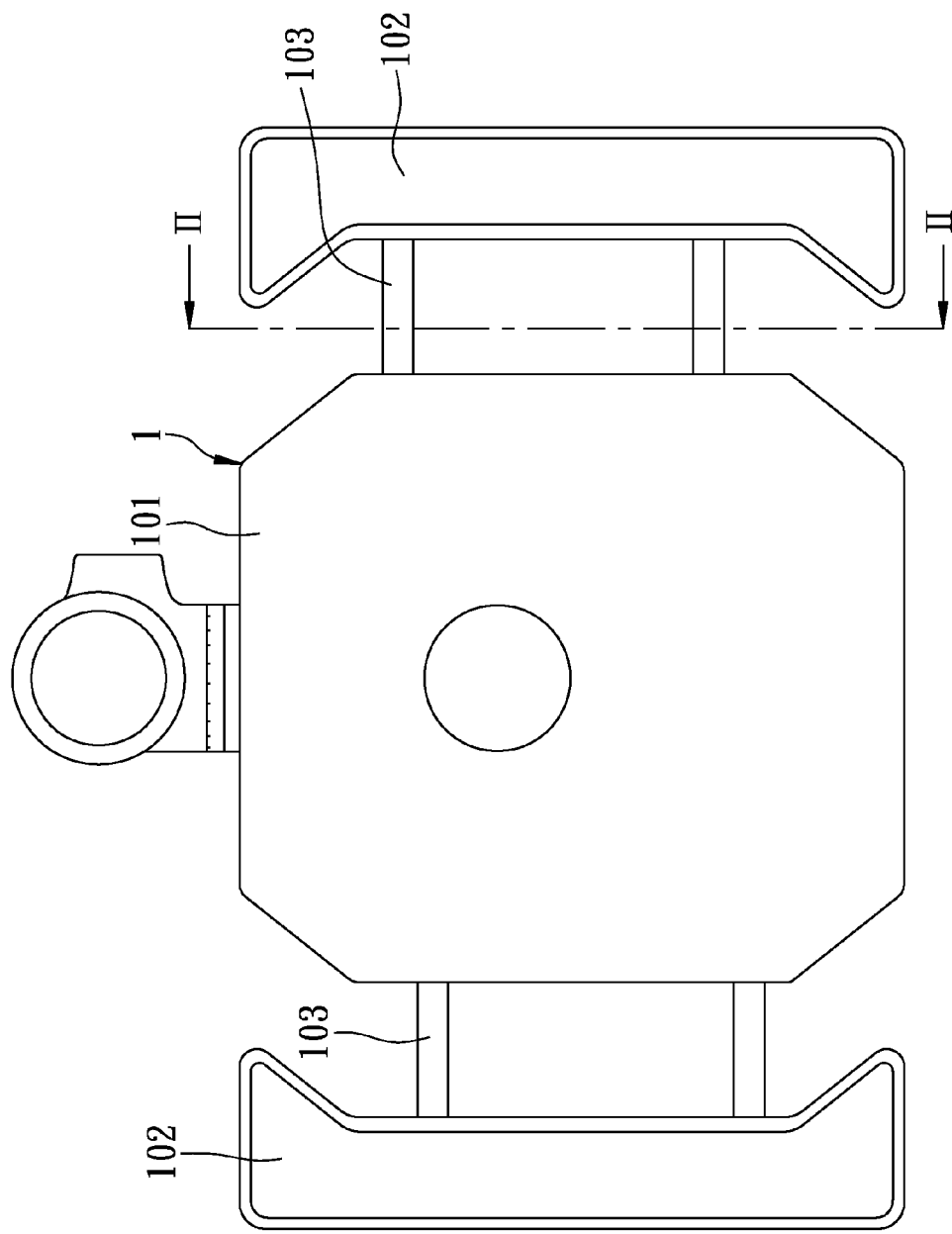
FIG. 1 is a top view of a conventional extension worktable for a machine tool.
Figure 2:
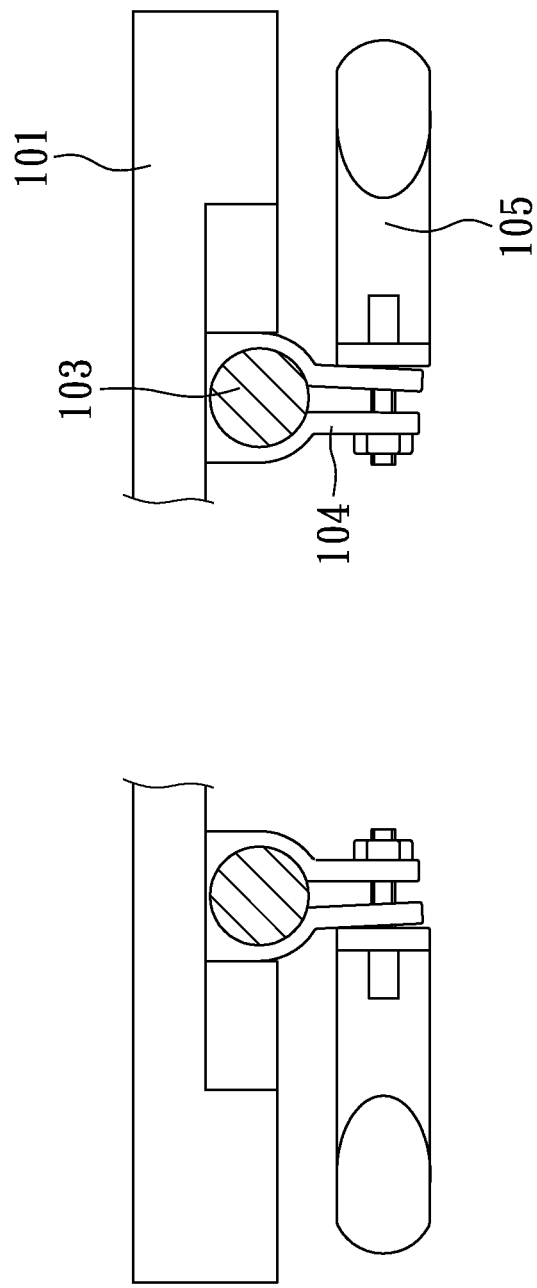
FIG. 2 is a sectional view taken along line II-II of FIG. 1.

It should be noted that the drawing figures are not necessarily drawn to scale, but instead are drawn to provide a better understanding of the components thereof, and are not intended to be limiting in scope, but rather to provide exemplary illustrations. It should further be noted that the figures illustrate exemplary embodiments of a length adjustable worktable and the components thereof, and in no way limit the structures, configurations and components thereof according to the present disclosure.

DETAILED DESCRIPTION

Figure 3:
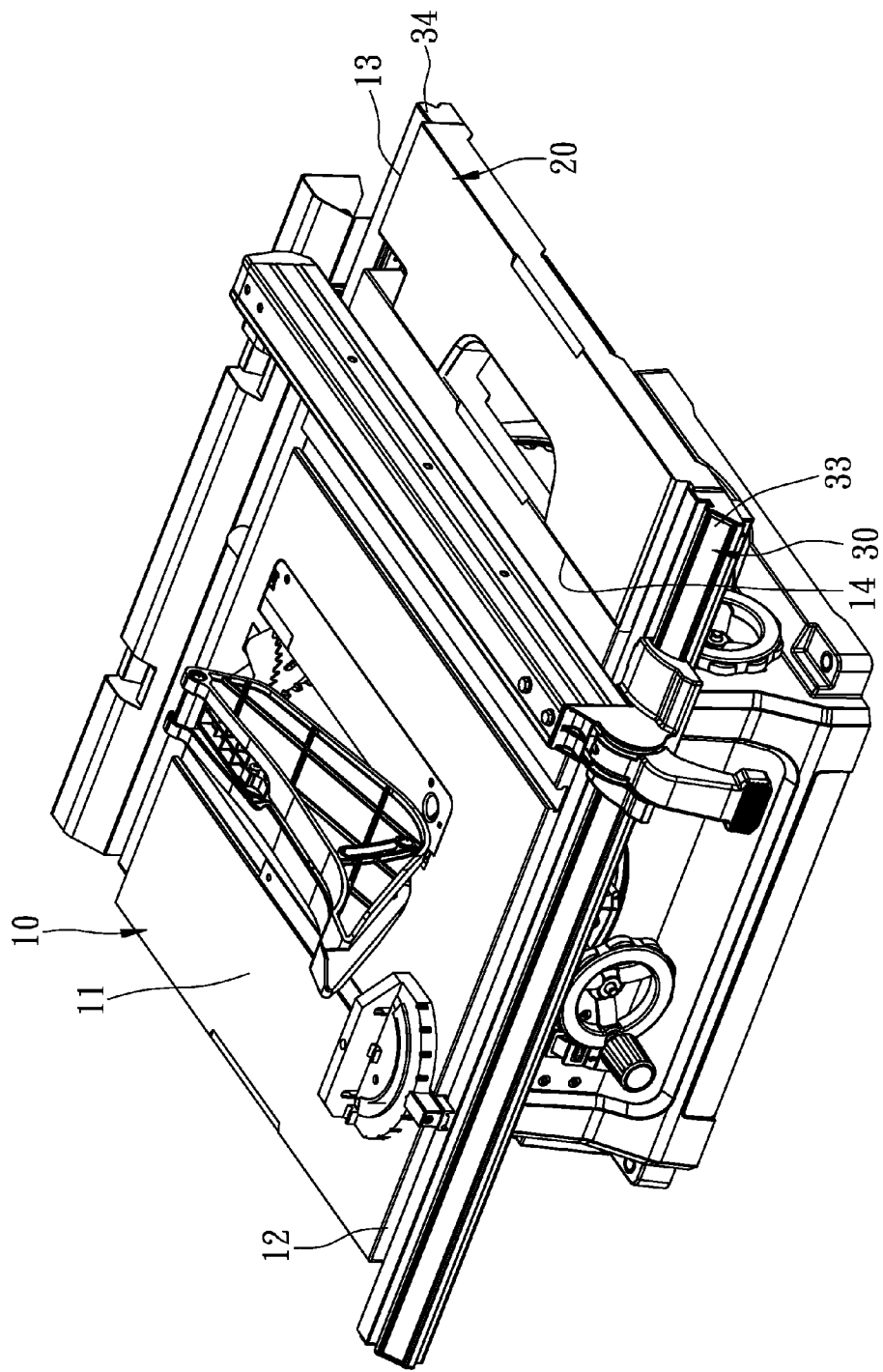
FIG. 3 is a top perspective view of a length adjustable worktable for a machine tool in accordance with the present invention.
Figure 4:
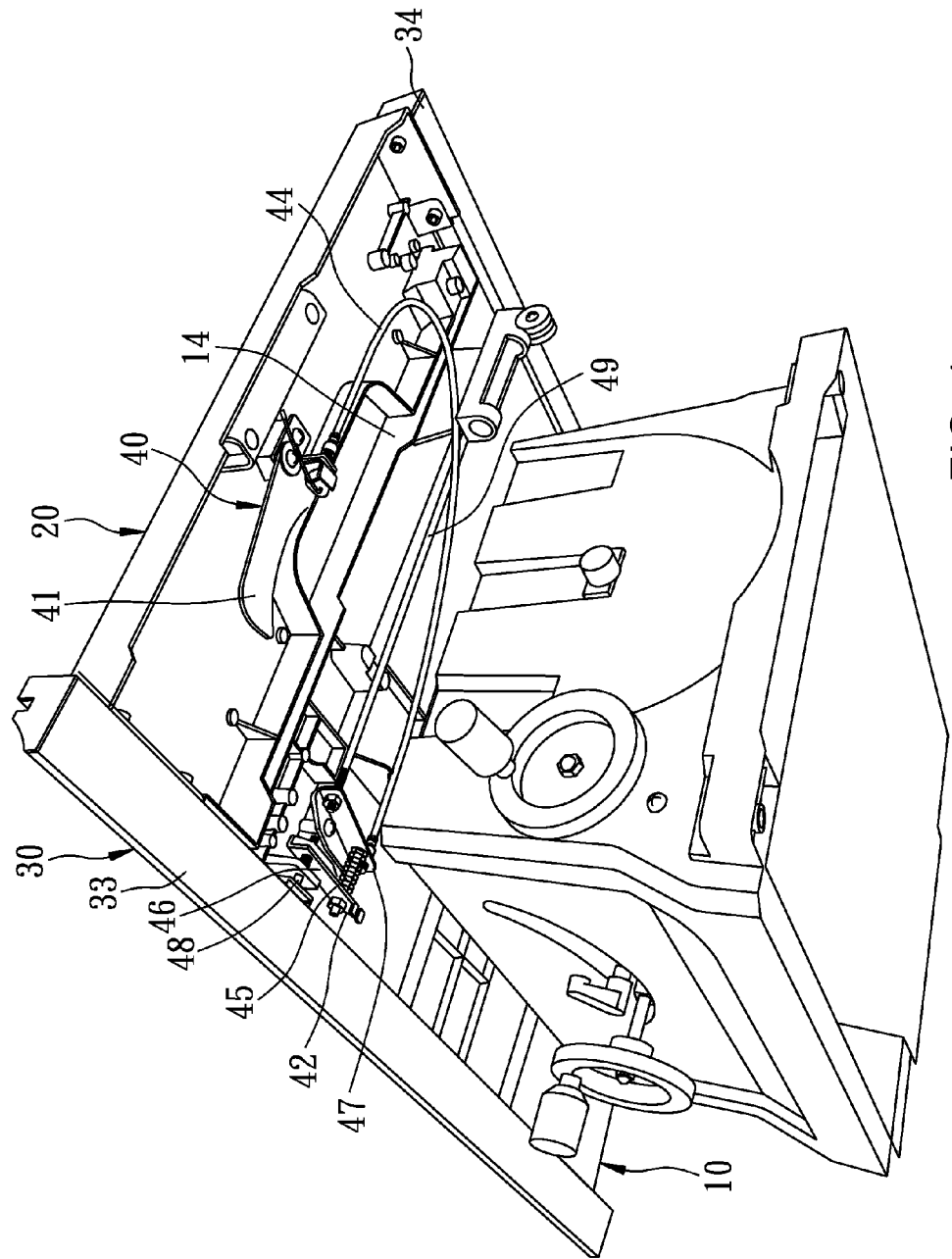
FIG. 4 is a bottom perspective view of the present invention, illustrating the arrangement of the actuating device in the length adjustable worktable.
Figure 5:
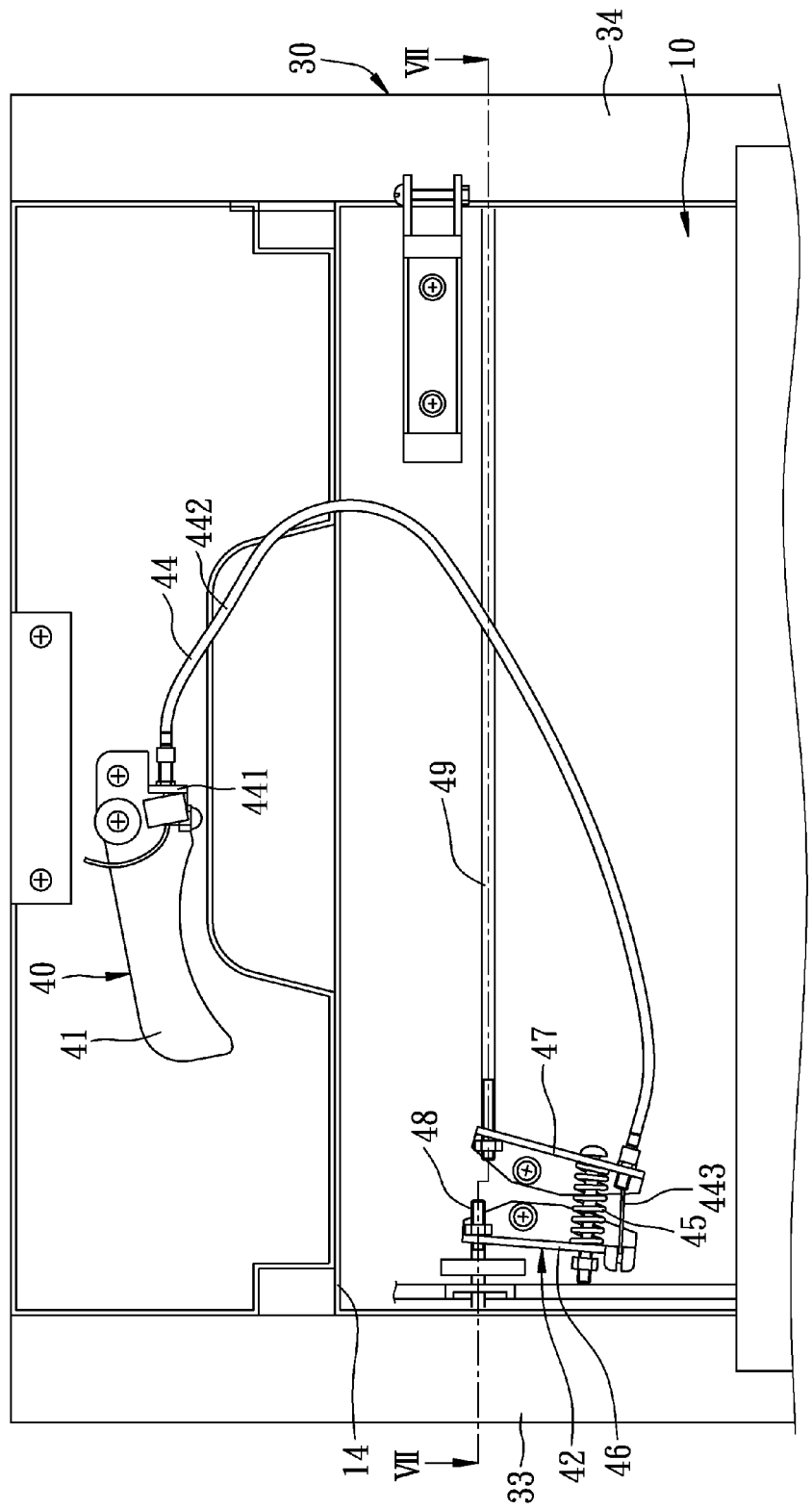
FIG. 5 is a schematic bottom view of the length adjustable worktable for a machine tool in accordance with the present invention.

Referring to FIGS. 3, 4 and 5, a length adjustable worktable in accordance with the present invention is shown. As illustrated, the length adjustable worktable comprises a main table 10, a side extension 20, a guide unit 30, and an actuating device 40.

The main table 10 comprises a top wall 11, a first sidewall 12 connected to one side of the top wall 11 at right angles, a second sidewall 13 connected to an opposite side of the top wall 11 at right angles, and an end wall 14 formed between the first sidewall 12 and the second sidewall 13.

The side extension 20 is located adjacent to the end wall 14, and is movable relative to the end wall 14 of the main table 10.

Figure 7:
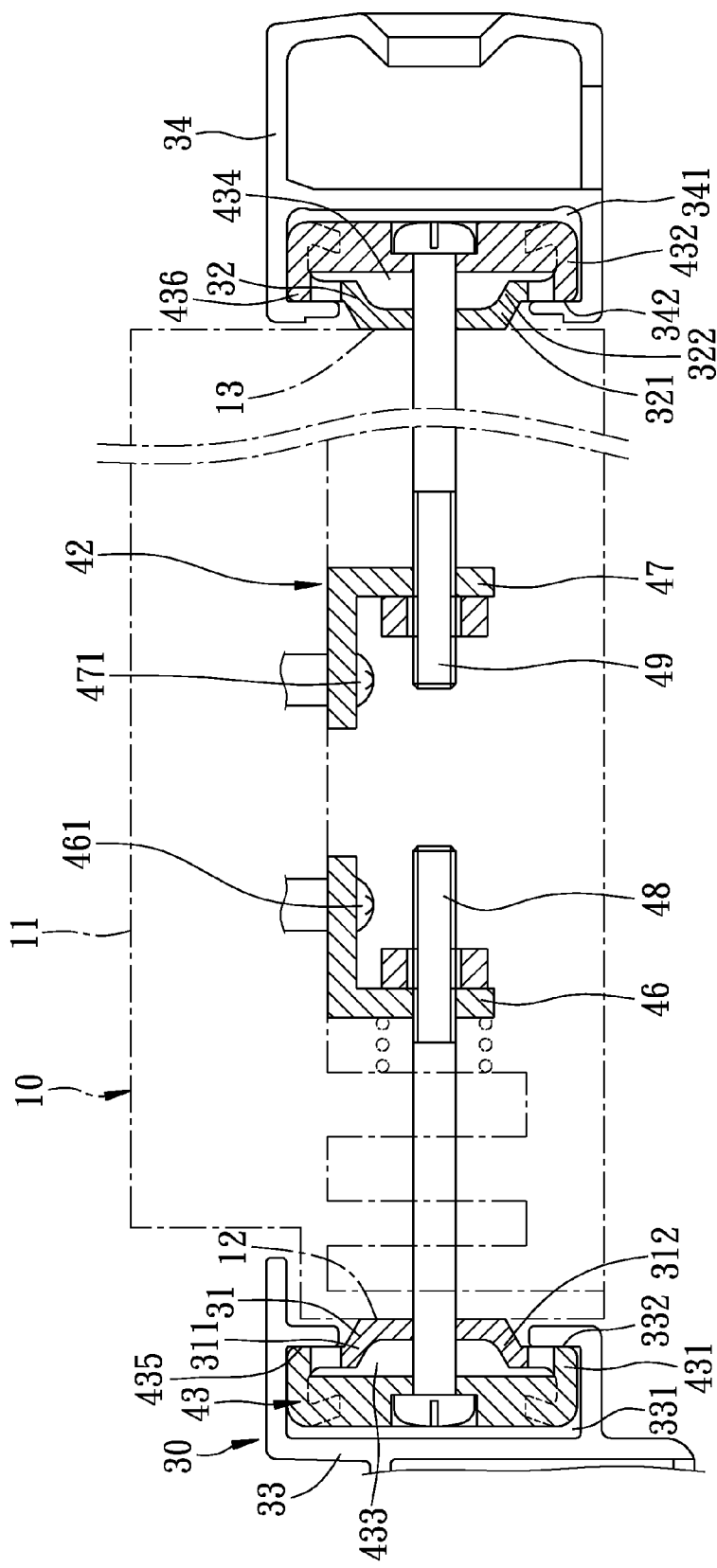
FIG. 7 is a sectional view taken along line VII-VII of FIG. 5.
Figure 8:
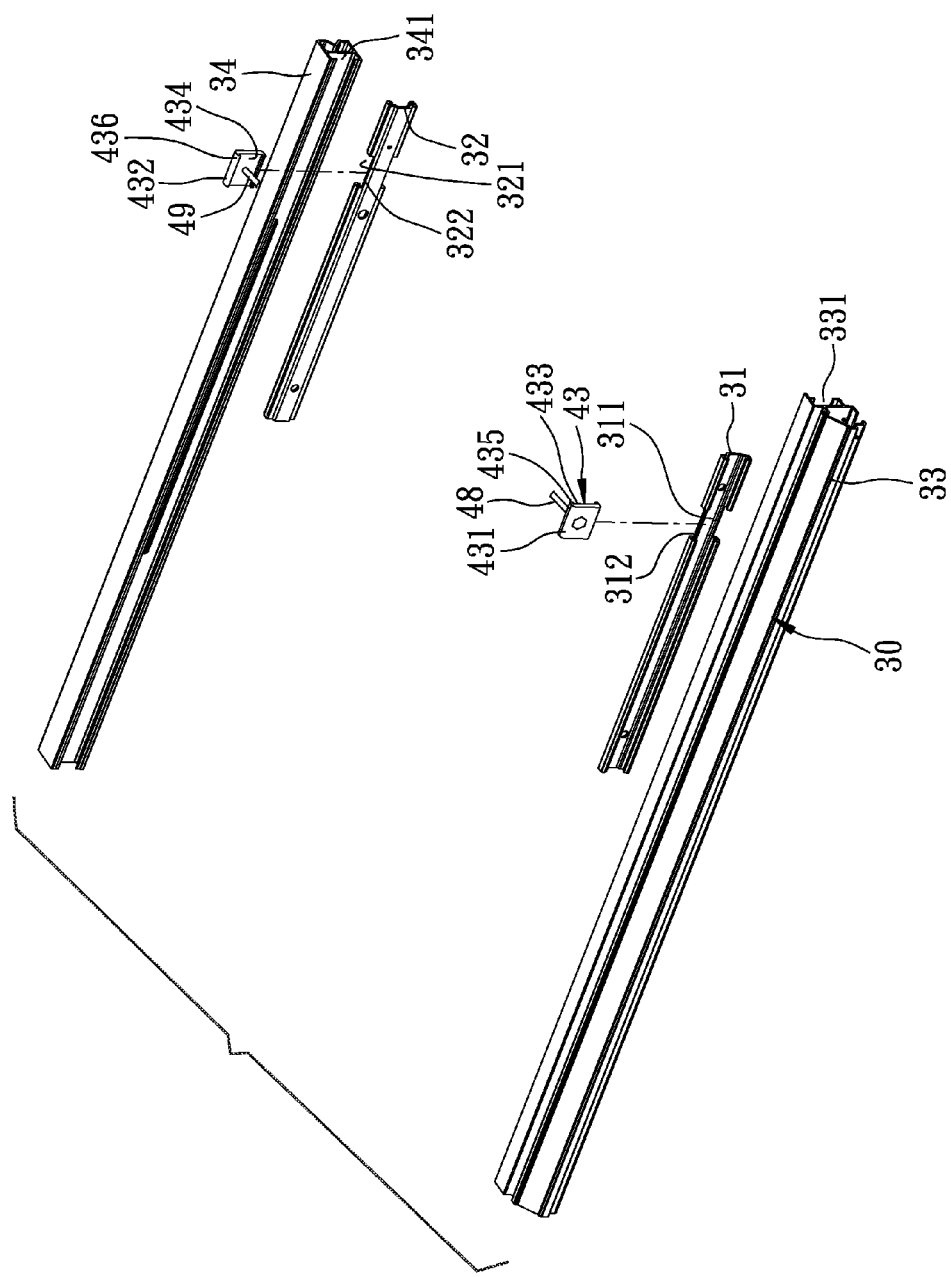
FIG. 8 is an exploded view of a part of the present invention, illustrating the structure of the guide unit, first and second axle shafts and first and second positioning blocks.

Referring also to FIGS. 7 and 8, the guide unit 30 is connected to the side extension 20 for enabling the side extension 20 to slide relative to the main table 10. The guide unit 30 comprises a first guide rail 31 affixed to the first sidewall 12, a second guide rail 32 affixed to the second side wall 13, a first sliding bar 33 correspondingly and slidably coupled to the first guide rail 31 and connected to the side extension 20, and a second sliding bar 34 correspondingly and slidably coupled to the second guide rail 32 and connected to the side extension 20. The first guide rail 31, the second guide rail 32, the first sliding bar 33 and the second sliding bar 34 may be aluminum extruded components.

The first guide rail 31 comprises a first notch 311, and a first bearing portion 312 disposed around the first notch 311.

The second guide rail 32 comprises a second notch 321 oppositely corresponding to the first notch 311, and a second bearing portion 322 disposed around the second notch 321.

The first sliding bar 33 has a first coupling groove 331 defined therein for slidably engaging the first guide rail 31. A first positioning wall 332 is located adjacent to the first coupling groove 331.

The second sliding bar 34 has a second coupling groove 341 defined therein for slidably engaging the second guide rail 32. A second positioning wall 342 is located adjacent to the second coupling groove 341.

Figure 6:
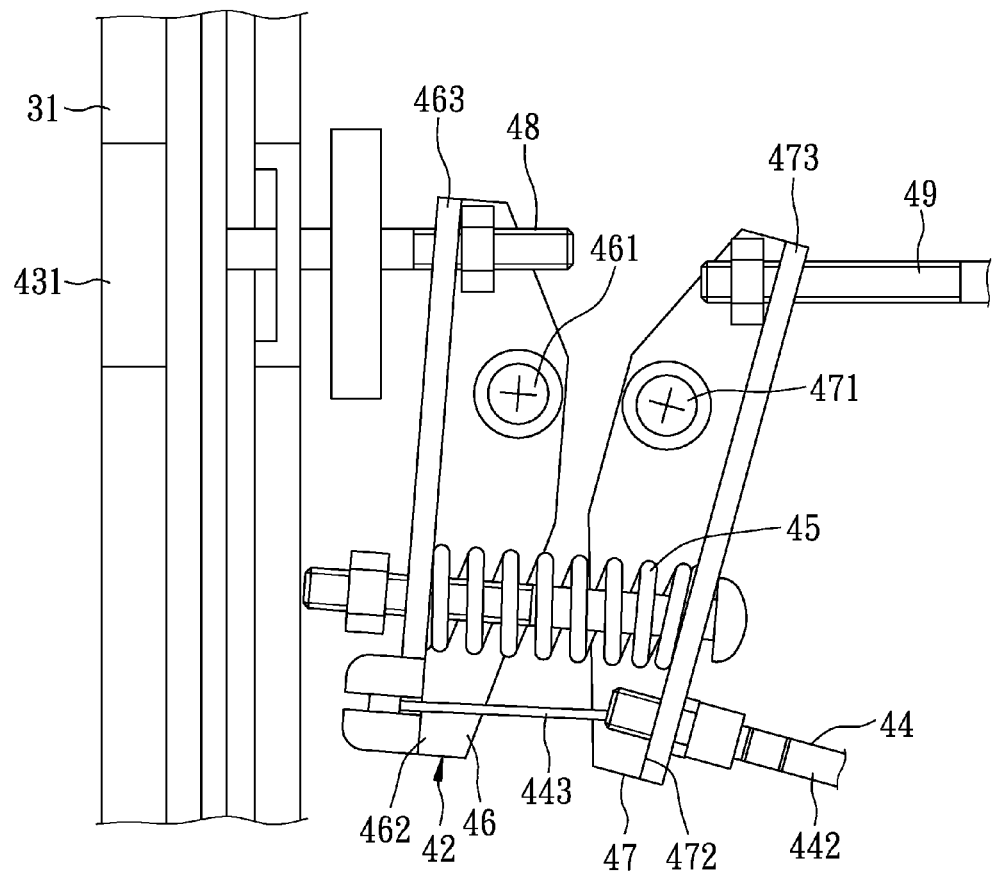
FIG. 6 is an enlarged view of a part of FIG. 5.

Referring also to FIG. 6, the actuating device 40 comprises an operating member 41 pivotally connected to the side extension 20, a driving unit 42 mounted at a bottom side of the main table 10, and a positioning member 43 connected to the driving unit 42.

The driving unit 42 comprises a first swing arm 46 pivotally connected to the main table 10, a second swing arm 47 which corresponds to the first swing arm 46 is pivotally connected to the main table 10 and laterally located relative to the first swing arm 46, a first axle shaft 48 connected to the first swing arm 46, a second axle shaft 49 connected to the second swing arm 47, a flexible brake member 44 connected between the operating member 41 and the second swing arm 47, and an elastic member 45 elastically disposed between the first swing arm 46 and the second swing arm 47. The elastic member 45 is adapted to provide an elastic potential energy to the brake member 44. The first swing arm 46 comprises a pivot connection portion 461 pivotally connected to the main table 10, a driven end 462 located at one side of the pivot connection portion 461 and pivotally drivable by the brake member 44, and a linking-up end 463 located at an opposite side of the pivot connection portion 461 and configured to drive the first axle shaft 48. The second swing arm 47 comprises a pivot connection portion 471 pivotally connected to the main table 10, a driven end 472 located at one side of the pivot connection portion 471 and pivotally drivable by the brake member 44, and a linking-up end 473 located at an opposite side of the pivot connection portion 471 and configured to drive the second axle shaft 49.

The positioning member 43 corresponds to the guide unit 30, and comprises a first positioning block 431 which is connected to the first axle shaft 48 and accommodated in the first notch 311, and a second positioning block 432 which is connected to the second axle shaft 49 and accommodated in the second notch 321. In this embodiment, the first positioning block 431 and the second positioning block 432 have a substantially C-shaped configuration. Further, the first positioning block 431 comprises a first positioning groove 433 which is detachably engaged to the first bearing portion 312 along an axial direction of the first axle shaft 48, and two first protruding portions 435 which are formed on two opposite ends of the first positioning groove 433 and face toward the first positioning wall 332. The second positioning block 432 comprises a second positioning groove 434 which is detachably engaged to the second bearing portion 322 along an axial direction of the second axle shaft 49, and two second protruding portions 436 which are formed on two opposite ends of the second positioning groove 434 and face toward the second positioning wall 342. Further, the first and second positioning blocks 431, 432 are displaceable in the first and second coupling grooves 331, 341, respectively, along the axial direction of the corresponding first and second axle shafts 48, 49 for clamping to or releasing from the first and second positioning walls 332, 342 of the first and second sliding bars 33, 34, respectively.

In this embodiment, the brake member 44 comprises a locating block 441 affixed to the side extension 20, a guide tube 442 connected between the locating block 441 and the driven end 472 of the second swing arm 47, and a steel rope 443 inserted through the guide tube 442 and connected between the operating member 41 and the first swing arm 46.

In this embodiment, the elastic member 45 is a compression spring located between the respective driven ends 462, 472 of the first swing arm 46 and the second swing arm 47. The elastic potential energy of the elastic member 45 enables the corresponding linking-up ends 463, 473 of the first and second swing arms 46, 47 to resiliently maintain the first axle shaft 48 and the second axle shaft 49 in an orientation toward each other, such that the first and second positioning blocks 431, 432 respectively abut against the first and second positioning walls 332, 342. Further, the restoring force of the elastic member 45 constantly positions the side extension 20 relative to the main table 10.

Referring to FIGS. 3 and 4, the worktable is shown in an orientation wherein the overall length is at its shortest. At this time, the side extension 20 is kept close to the end wall 14 of the main table 10 and, as shown in FIGS. 5 and 6, subject to the effect of the restoring force of the elastic member 45, the driven ends 462, 472 of the corresponding first and second swing arms 46, 47 are resiliently urged away from each other, and the corresponding linking-up ends 463, 473 are resiliently drawn toward each other. At this time, as shown in FIG. 7, the first and second positioning blocks 431, 432 are respectively driven by the first and second axle shafts 48, 49 such that the first protruding portions 435 and the second protruding portions 436 are slightly protruding over the corresponding first and second guide rails 31, 32 and are abutting against the first and second positioning walls 332, 342, respectively. Further the first sliding bar 33 and the second sliding bar 34 are positioned on the first guide rail 31 and the second guide rail 32, respectively, and thus the side extension 20 is kept in position relative to the main table 10.

Figure 9:
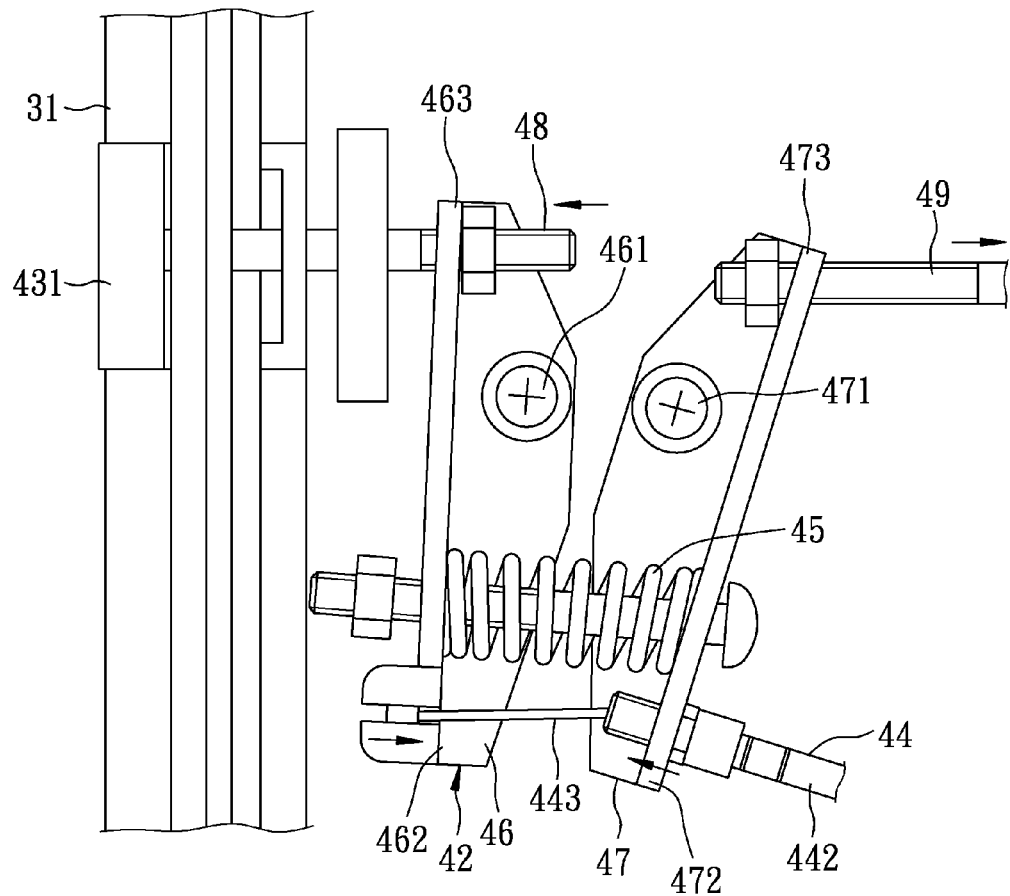
FIG. 9 is similar to FIG. 6, illustrating an operation status of the present invention.
Figure 10:
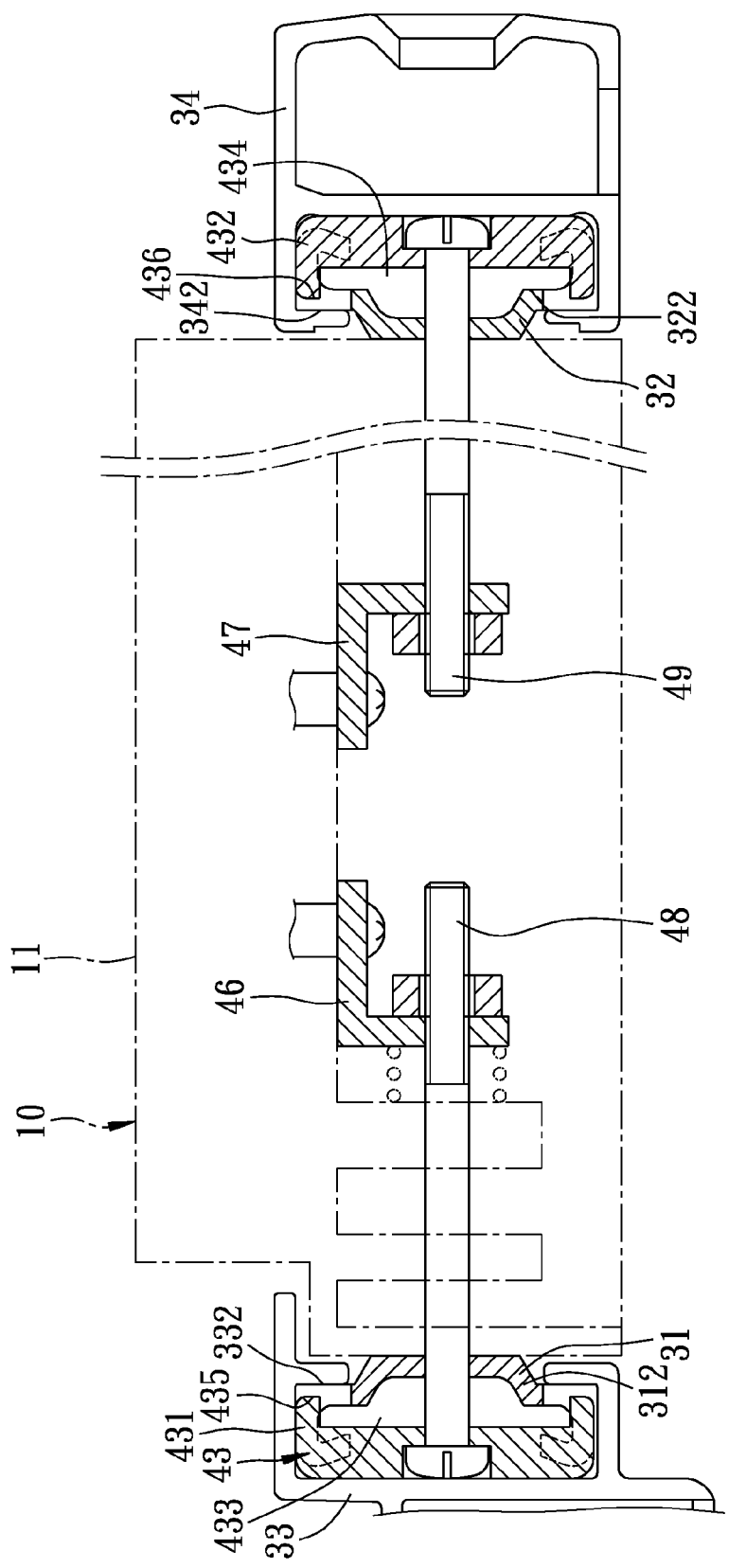
FIG. 10 is similar to FIG. 7, illustrating an operation status of the present invention.
Figure 11:
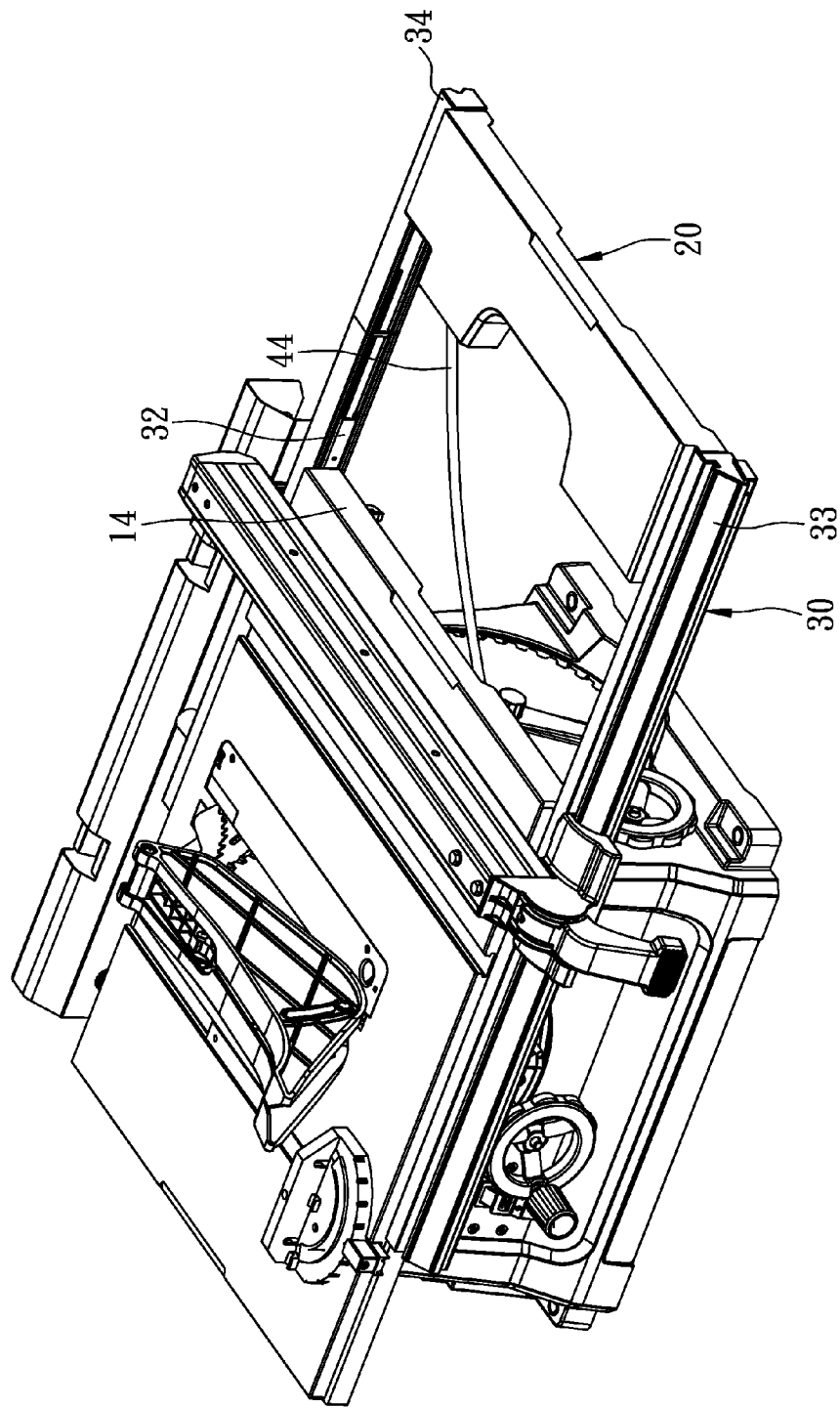
FIG. 11 is a top perspective view of the present invention, illustrating the side extension extended out of the main table.

Referring to FIGS. 9-11 and FIGS. 5 and 6 again, when wishing to adjust the overall length of the worktable, a user operates the operating member 41 to pull the steel rope 443 for driving the driven ends 462, 472 of the corresponding first and second swing arms 46, 47 toward each other (wherein the elastic member 45 is compressed) and the linking-up ends 463, 473 are driven away from each other. At this time, the first and second positioning blocks 431, 432 are respectively driven by the first and second axle shafts 48, 49 to release the first and second protruding portions 435, 436 from the first and second positioning walls 332, 342, allowing the first and second sliding bars 33, 34 to be moved relative to the first and second guide rails 31, 32. Thus, the operator can pull the side extension 20 outwards relative to the main table 10 to adjust the worktable to the desired length.

After adjustment of the length of the worktable, by releasing the operating member 41, the elastic potential energy of the elastic member 45 resiliently restores for moving the corresponding driven ends 462, 472 of the first and second swing arms 46, 47 away from each other. At the same time, the operating member 41 is driven by the steel rope 443 to restore to its former position, and the linking-up ends 463, 473 are moved toward each other to respectively urge the first and second protruding portions 435, 436 of the first and second positioning blocks 431, 432 into abutment against the first and second positioning walls 332, 342, such that the first and second sliding bars 33, 34 are respectively positioned on the first and second guide rails 31, 32. Thus the side extension 20 is locked to the main table 10, and the work table is returned to the status shown in FIGS. 6 and 7.

Therefore, under normal conditions, the effect of the elastic potential energy of the elastic member 45 enables the first and second swing arms 46, 47 to drive the respective first and second axle shafts 48, 49 and to further urge the first and second positioning blocks 431, 432 into abutment against the first and second positioning walls 332, 342. Thus, the first and second sliding bars 33, 34 are locked to the first and second guide rails 31, 32, respectively, and therefore the side extension 20 is locked to the main table 10. When operating the operating member 41, the first and second swing arms 46, 47 are driven to consequently drive the first and second positioning blocks 431, 432, such that the first and second positioning blocks 431, 432 are released from the corresponding first and second positioning walls 332, 342. This allows the first and second sliding bars 33, 34 to slide relative to the first and second guide rails 31, 32 such that the side extension 20 is movably manipulated, and thus the position of the side extension 20 is adjusted relative to the main table 10. Thus, the invention allows the user to adjust the overall length of the worktable conveniently with one hand. This design of length adjustable worktable has a simple structure and facilitates adjustment.

It is worth mentioning that in this embodiment, by simply utilizing the operating member 41, the corresponding driven ends 462, 472 of the first and second swing arms 46, 47 are driven, such that the first and second positioning blocks 431, 432 are simultaneously driven to release from the first and second positioning walls 332, 342, respectively. However, it is to be noted that simply using the operating member 41 to drive the brake member 44 in moving the first swing arm 46 and the first positioning block 431 relative to the first positioning wall 332 can achieve the expected result, i.e., using one single positioning member can exert a clamping force to the first sliding bar 33 or the second sliding bar 34 of the guide unit 30.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A length adjustable worktable, comprising:
a main table;
a side extension movable relative to said main table;
a guide unit connected to said side extension for enabling said side extension to slide relative to said main table; and
an actuating device comprising an operating member mounted at said side extension, a driving unit mounted at said main table and drivable by said operating member, and a positioning member connected to said driving unit corresponding to said guide unit,
wherein said driving unit comprises a first swing arm pivotally connected to said main table, a second swing arm pivotally connected to said main table and laterally located relative to said first swing arm, a first axle shaft connected to said first swing arm, and a second axle shaft connected to said second swing arm,
wherein said driving unit and said positioning member being movable by said operating member for locking or unlocking said side extension relative to said main table.

2. The length adjustable worktable as claimed in claim 1, wherein said main table comprises a first sidewall and a second sidewall opposite to said first sidewall; said guide unit comprises a first guide rail fixedly mounted at said first sidewall, a second guide rail fixedly mounted at said second sidewall, a first sliding bar slidably coupled to said first guide rail and connected to said side extension, and a second sliding bar slidably coupled to said second guide rail and connected to said side extension; and wherein said positioning member is configured to lock at least one of said first and second sliding bars of said guide unit in position.

3. The length adjustable worktable as claimed in claim 2, wherein said first guide rail, said second guide rail, said first sliding bar and said second sliding bar of said guide unit are aluminum extruded components.

4. A length adjustable worktable, comprising:
a main table;
a side extension movable relative to said main table;
a guide unit connected to said side extension for enabling said side extension to slide relative to said main table; and
an actuating device comprising an operating member mounted at said side extension, a driving unit mounted at said main table and drivable by said operating member, and a positioning member connected to said driving unit corresponding to said guide unit, said driving unit and said positioning member being movable by said operating member for locking or unlocking said side extension relative to said main table,
wherein said driving unit comprises a flexible brake member connected to said operating member, and an elastic member configured to exert a restoring force to said brake member, wherein the restoring force of said elastic member is capable to constantly maintain said positioning member and said guide unit in position to lock said side extension to said main table.

5. The length adjustable worktable as claimed in claim 4, wherein said main table comprises a first sidewall and a second sidewall opposite to said first sidewall; and said guide unit comprises a first guide rail fixedly mounted at said first sidewall, a second guide rail fixedly mounted at said second sidewall, a first sliding bar slidably coupled to said first guide rail and connected to said side extension, and a second sliding bar slidably coupled to said second guide rail and connected to said side extension.

6. The length adjustable worktable as claimed in claim 5, wherein said first guide rail of said guide unit comprises a first notch, said second guide rail of said guide unit comprises a second notch corresponding to said first notch, said first sliding bar comprises a first coupling groove defined therein for engaging said first guide rail, and said second sliding bar comprises a second coupling groove defined therein for engaging said second guide rail.

7. The length adjustable worktable as claimed in claim 6, wherein said driving unit of said actuating device further comprises a first swing arm pivotally connected to said main table, a second swing arm pivotally connected to said main table and laterally located relative to said first swing arm, a first axle shaft connected to said first swing arm, and a second axle shaft connected to said second swing arm.

8. The length adjustable worktable as claimed in claim 7, wherein said first and second swing arms each comprise a respective pivot connection portion pivotally connected to said main table; wherein each pivot connection portion has a driven end located at one side of said pivot connection portion and movable by said brake member, and a linking-up end located at an opposite side of said pivot connection portion for respectively driving said first axle shaft and said second axle shaft.

9. The length adjustable worktable as claimed in claim 8, wherein said elastic member is elastically and compressibly located between the driven ends of said first swing arm and said second swing arm.

10. The length adjustable worktable as claimed in claim 8, wherein said brake member of said driving unit comprises a locating block affixed to said side extension, a guide tube connected between said locating block and the driven end of said second swing arm, and a steel rope inserted through said guide tube and connected between said operating member and the driven end of said first swing arm.

11. The length adjustable worktable as claimed in claim 8, wherein said elastic member of said driving unit is a compression spring disposed between the driven end of said first swing arm and the driven end of said second swing arm.

12. The length adjustable worktable as claimed in claim 7, wherein said positioning member comprises a first positioning block connected to said first axle shaft and accommodated in said first notch, and a second positioning block connected to said second axle shaft and accommodated in said second notch, wherein said first positioning block and said second positioning block are respectively displaceable in said first coupling groove and said second coupling groove along an axial direction of said first axle shaft and said second axle shaft.

13. The length adjustable worktable as claimed in claim 12, wherein said first sliding bar of said guide unit comprises a first coupling groove defined therein for engaging said first guide rail, and a first positioning wall disposed adjacent to said first coupling groove corresponding to said first positioning block; wherein second sliding bar comprises a second coupling groove defined therein for engaging said second guide rail, and a second positioning wall disposed adjacent to said second coupling groove corresponding to said second positioning block; and wherein said first positioning block and said second positioning block are respectively movable to abut against or release from said first sliding bar and said second sliding bar.

14. The length adjustable worktable as claimed in claim 7, wherein said first swing arm and said second swing arm each comprise a pivot connection portion respectively pivotally connected to said main table; wherein each pivot connection has a driven end located at one side of said pivot connection portion and movable by said brake member, and a linking-up end located at an opposite side of said pivot connection portion for respectively driving said first axle shaft and said second axle shaft; and wherein said positioning member comprises a first positioning block connected to said first axle shaft and accommodated in said first notch, and a second positioning block connected to said second axle shaft and accommodated in said second notch, said first positioning block and said second positioning block being respectively displaceable in said first coupling groove and said second coupling groove along an axial direction of said first and second axle shafts.

* * * * *